Dec. 27, 1955 R. E. LEGATE 2,728,891
MODULATION CIRCUIT ARRANGEMENTS
Filed April 10, 1951

Inventor
REX EDWARD LEGATE
By Ralph E. Atherton
Attorney 2,728,891
Patented Dec. 27, 1955

2,728,891

MODULATION CIRCUIT ARRANGEMENTS

Rex Edward Legate, Edmonton, London, England, assignor to Electric & Musical Industries Limited, Hayes, England, a British company Application April 10, 1951, Serial No. 220,158

Claims priority, application Great Britain April 15, 1950

5 Claims. (Cl. 332—37)

Figure 1:
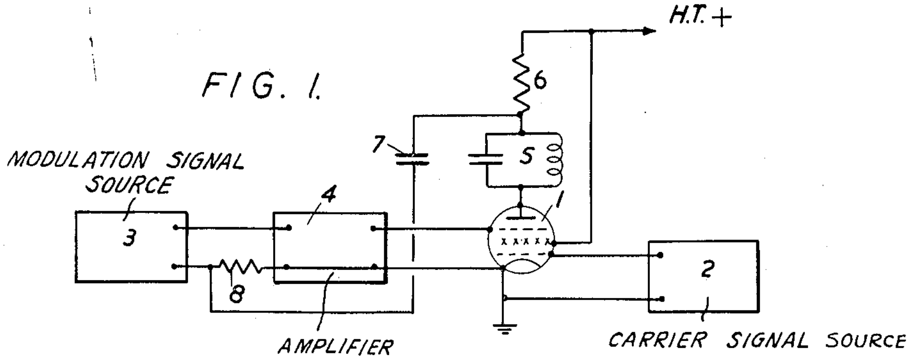

This invention relates to modulation circuit arrangements.

One form of amplitude modulation circuit arrangement which has been proposed hitherto, utilises what is termed suppressor grid modulation. An arrangement of this form comprises a pentode valve, which has the carrier frequency signal applied between the control electrode and cathode and the modulating frequency signal applied to the electrode which is usually called the suppressor electrode. The modulating signal controls the division of the cathode current in the valve between the screen electrode and the anode and it can be shown that the modulated anode current in the valve can be expressed as:

$$i_a+i_akE_m \sin pt+g_mE_c \sin \omega t+g_m\frac{kE_cE_m}{2}[\cos(\omega-p)t-\cos(\omega+p)t]$$

where $E_c \sin \omega t$ and $E_m \sin pt$ are respectively the carrier frequency signal and the modulating signal, $g_m$ is the transconductance of the valve at zero potential on the suppressor electrode, $i_a$ is the anode current under the same condition, and $k$ is a factor depending on the control of the suppressor electrode on the division of current between the screen electrode and anode.

Assuming that $g_m$ is constant, the linearity of modulation is dependent upon $k$ and in practice the disadvantage arises that $k$ is not constant but is dependent upon the instantaneous amplitude of modulating voltage, giving rise to substantial non-linearity of modulation. This is especially so if 100 per cent modulation is required, when the suppressor electrode is driven to anode current cut-off by the negative peak modulation voltage.

An arrangement of this form can also be used for frequency modulation, if the pentode valve is employed as a reactance valve in an oscillator tank circuit so that the transconductance of the valve is controlled by a modulating signal applied to the suppressor electrode, and a similar disadvantage is liable to arise.

The object of the present invention is to reduce such disadvantage.

According to the present invention there is provided a modulation circuit arrangement which comprises a thermionic valve having a control electrode disposed between two positively polarised electrodes and wherein the modulating signal is so applied to said control electrode as to control the division of the cathode current in said valve between said positively polarised electrodes and thereby to give rise to modulation, and wherein means are provided for deriving signals from the modulating frequency component of the current flowing to one of said positively polarised electrodes and a circuit connection for applying said derived signals in negative sense to the modulation input circuit in such manner as to increase the linearity of modulation.

The present invention is based on the fact that if, in the case analysed in the second paragraph of the specification, $k$ is not constant, the modulating frequency component in the anode current or screen current of the modulator valve will be distorted in the same manner as the side bands of the modulated components, as can be observed from the aforesaid expression for the anode current which shows that the modulation frequency component $i_akE_m \sin pt$, is a function of $k$. The modulation frequency component can thus be used to correct for non-linearity in the modulation.

Figure 2:
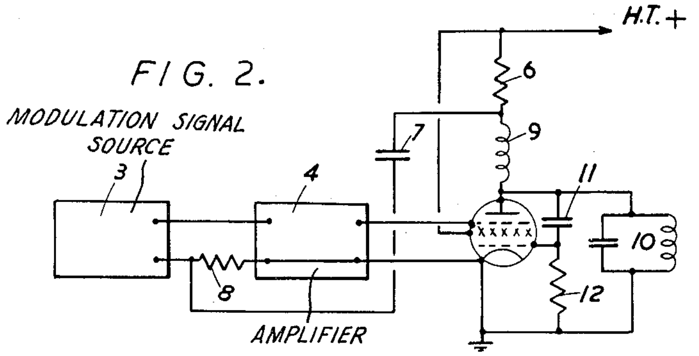

In order that the said invention may be clearly understood and readily carried into effect, the same will now be more fully described with reference to the accompanying drawings, in which:

Figure 1 illustrates one example of the present invention applied to an amplitude modulation circuit arrangement, and Figure 2 illustrates a modification of Figure 1 applicable to frequency modulation.

Referring to the drawing, the arrangement shown in Figure 1 comprises a pentode valve 1, and the carrier frequency signal to be modulated is applied from a source indicated in block form at 2 between the control electrode and cathode of the valve 1. The modulating signal, which will be assumed to be an audio frequency signal, is fed from a source 3 to the input of an amplifier 4 which is shown merely in block form since it may be of conventional construction. The amplified output of the modulating signal from the amplifier 4 is applied between the suppressor electrode and the cathode of the valve 1. The anode circuit of the valve 1 comprises a resonant output circuit 5 tuned to the carrier frequency, and the resistance 6 connected in series with the output circuit 5. The impedance of the resonance circuit 5 will be relatively small at the frequency of the modulating signal. The lower end (in the drawing) of the resistance 6 is connected for negative feedback by means of a condenser 7 to the input of the amplifier 4, the feedback being applied across resistance 8 which is of a large value compared with the resistance 6. In practice the resistance 6 will be decoupled for carrier frequencies by means of a condenser in known manner.

In the operation of the arrangement, potential variations are set up across the resistance 6 proportional to the modulation frequency component in the anode current of the valve 1, that is proportional to the term $i_akE_m \sin pt$ of the expression quoted in the second paragraph of this specification. The carrier and sideband frequency components of the current in the valve 1 will produce substantially no potential variations across the resistance 6 since the impedance of the resistance 6 at the carrier and sideband frequencies (taking account of the fact that the resistance 6 is decoupled at these frequencies) is small compared with the impedance of the output circuit 5. The feedback of the modulation frequency component effectively reduces the gain of the arrangement (from the input to the amplifier 4 to the lower end of resistance 6) by a factor $1/(1+G)$, where G is the value of the gain in the absence of the feedback. Therefore, in order to obtain a desired percentage of modulation it is necessary to increase the amplitude of the modulation signal at the input of the amplifier 4 by a factor of approximately G. However, the feedback also serves to reduce, by the same factor of $1/(1+G)$, the modulation frequency harmonic content in the output set up across the output circuit 5, due to non-linearity in the operation of the valve 1. The harmonic content will arise mainly due to variations in the aforesaid factor $k$ and the reduction of the harmonic content will have the effect of rendering the modulation of the arrangement substantially more linear than would otherwise be the case since the non-linearity in modulation is also dependent mainly upon variations in $k$. In other words the modulation-frequency potential developed across the resistance 6 will have substantially the same wave shape as the modulation envelope across the output circuit 5, provided the circuit 5 does not give rise to any clipping of the sideband components.

Figure 2 shows a modification of Figure 1 which is applicable where frequency modulation is required instead of amplitude modulation. The same reference numerals have been used to indicate similar parts in Figures 1 and 2. The circuit 5 of Figure 1 has been replaced by a high frequency choke 9, the impedance of which will of course be relatively high at carrier frequency and relatively low at the modulating frequency. The tank circuit 10 of an oscillator, which is not otherwise illustrated, is connected between the anode and cathode of the valve 1, and the anode of the valve 1 is coupled to the control electrode thereof by a condenser 11 and resistance 12 as shown so that the valve 1 functions as a reactance valve. The transconductance of the valve 1 is controlled by the modulating signal applied to the suppressor-grid from the amplifier 4, the reactance presented by the valve 1 to the tank circuit 10 varies correspondingly and consequently the output of the oscillator is modulated in frequency. The negative feedback from the resistance 6 to the input of the amplifier 4, as in Figure 1, results in an almost linear relationship between the modulating signal applied to the suppressor electrode and the effective reactance presented by the valve 1 to the tank circuit.

What I claim is:

1. A modulating circuit arrangement comprising a thermionic valve having an anode and a cathode, a screen electrode between said anode and said cathode, means for positively polarizing said anode and said screen electrode with respect to said cathode, a control electrode between said screen electrode and said anode, means for applying oscillations to said valve to vary the cathode current therein, a source of modulating signals, an input circuit for applying said modulating signals to said control electrode to control the division of cathode current in said valve between said positively polarized electrodes to modulate said oscillations, an impedance for modulated oscillations connected to one of said positively polarised electrodes and having a relatively high value at the frequency of said oscillations and a relatively low value at the frequency of said modulating signals, a second impedance connected to one of said positively polarised electrodes and having a relatively high value at the frequency of the modulating signals and a relatively low value at the frequency of said oscillations, and a circuit connection from said second impedance to said input circuit for applying signals of the modulating frequency in a negative sense to said input circuit to increase the linearity of modulation.

2. A modulating circuit arrangement comprising a thermionic valve having an anode and a cathode, a screen electrode between said anode and said cathode, means for positively polarizing said anode and said screen electrode with respect to said cathode, a first control electrode between said cathode and said screen electrode, a source of oscillations, means for applying said oscillations to said first control electrode to control the cathode current in said valve, a second control electrode between said screen electrode and said anode, a source of modulating signals, an input circuit for applying said modulating signals to said second control electrode to control the division of the cathode current in said valve between said anode and said screen electrode, an impedance connected to one of said positively polarised electrodes and having a relatively high value at the frequency of said oscillations and a relatively low value at the frequency of said modulating signals, means for deriving an amplitude modulated output of said oscillations from said impedance, a second impedance connected to one of said positively polarised electrodes and having a relatively high value at the frequency of the modulating signals and a relatively low value at the frequency of said oscillations, and a circuit connection from said second impedance to said input circuit for applying signals of the modulating frequency in a negative sense to control the current stream in said valve to increase the linearity of modulation.

3. A modulating circuit arrangement comprising a thermionic valve having an anode and a cathode, a screen electrode between said anode and said cathode, means for positively polarizing said anode and said screen electrode with respect to said cathode, a control electrode between said screen electrode and said anode, an oscillator tank circuit including said valve coupled as a reactance therein, a source of modulating signals, an input circuit for applying said modulating signals to said control electrode to control the division of cathode current in said valve between said positively polarized electrodes to vary the reactance of said valve in said tank circuit and thereby the frequency of said tank circuit, an impedance for modulated oscillations connected to one of said positively polarised electrodes and having a relatively high value at the frequency of said oscillations and a relatively low value at the frequency of said modulating signals, a second impedance connected to one of said positively polarised electrodes and having a relatively high value at the frequency of the modulating signals and a relatively low value at the frequency of said oscillations, and a circuit connection from said second impedance to said input circuit for applying signals of the modulating frequency in a negative sense to said input circuit to increase the linearity of modulation.

4. A modulating circuit arrangement comprising a thermionic valve having an anode and a cathode, a screen electrode between said anode and said cathode, means for positively polarizing said anode and said screen electrode with respect to said cathode, a first control electrode between said cathode and said screen electrode, an oscillator tank circuit including the anode-to-cathode path of said valve, an impedance for modulated oscillations connected to the anode of said valve and having a relatively high value at the frequency of said oscillations and a relatively low value at the frequency of said modulating signals, means coupling the anode of said valve to said first control electrode to cause said anode-to-cathode path to have a reactive impedance, a second control electrode between said screen electrode and said anode, a source of modulating signals, an amplifier having an input circuit coupled to said source for applying said modulating signals to said second control electrode to control the division of cathode current in said valve between said anode and said screen electrode to vary the reactive impedance of said anode-to-cathode path and thereby the frequency of said tank circuit, a second impedance connected to said anode and having a relatively high value at the frequency of the modulating signals and a relatively low value at the frequency of said oscillations, and a circuit connection from said second impedance to said input circuit for applying signals of the modulating frequency in a negative sense to said amplifier input circuit to increase the linearity of modulation.

5. A modulating circuit arrangement comprising a thermionic valve having an anode and a cathode, a screen electrode between said anode and said cathode, means for positively polarizing said anode and said screen electrode with respect to said cathode, a control electrode between said screen electrode and said anode, means for applying oscillations to said valve to vary the cathode current therein, a source of modulating signals, an amplifier having an input circuit coupled to said source for applying said modulating signals to said control electrode to control the division of cathode current in said valve between said positively polarized electrodes to modulate said oscillations, an impedance for modulated oscillations connected to one of said positively polarised electrodes and having a relatively high value at the frequency of said oscillations and a relatively low value at the frequency of said modulating signals, a second impedance connected to one of said positively polarised electrodes and having a relatively high value at the frequency of the modulating signals and a relatively low value at the frequency of said oscillations, and a circuit connection from said second impedance to said input circuit for applying signals of the modulating frequency in a negative sense to said input circuit to increase the linearity of modulation.

References Cited in the file of this patent

UNITED STATES PATENTS

| | | |
|---|---|---|
| 2,334,726 | Rankin | Nov. 23, 1943 |
| 2,347,458 | Brown | Apr. 25, 1944 |
| 2,436,802 | Glessner | Mar. 2, 1948 |
| 2,582,673 | Boelens | Jan. 15, 1952 |
| 2,614,247 | Boisvieux et al. | Oct. 14, 1952 |